(12) United States Patent
Kim et al.

(10) Patent No.: US 11,529,842 B2
(45) Date of Patent: Dec. 20, 2022

(54) VEHICLE AIR CONDITIONING APPARATUS

(71) Applicant: Hanon Systems, Daejeon (KR)

(72) Inventors: Tae Wan Kim, Daejeon (KR); Yong Eun Seo, Daejeon (KR); Jeong Hun Seo, Daejeon (KR); Myoung Jun Kim, Daejeon (KR); Jong Gon Lee, Daejeon (KR); Tae Gun Lee, Daejeon (KR); Jae Hwan Jung, Daejeon (KR); Sae Dong Eom, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 432 days.

(21) Appl. No.: 16/617,569

(22) PCT Filed: May 31, 2018

(86) PCT No.: PCT/KR2018/006201
§ 371 (c)(1),
(2) Date: Nov. 27, 2019

(87) PCT Pub. No.: WO2018/221975
PCT Pub. Date: Dec. 6, 2018

(65) Prior Publication Data
US 2020/0180394 A1    Jun. 11, 2020

(30) Foreign Application Priority Data

Jun. 2, 2017 (KR) .................. 10-2017-0068767
May 23, 2018 (KR) .................. 10-2018-0058067

(51) Int. Cl.
*B60H 1/00* (2006.01)

(52) U.S. Cl.
CPC ..... *B60H 1/00285* (2013.01); *B60H 1/00021* (2013.01); *B60H 1/00207* (2013.01);
(Continued)

(58) Field of Classification Search
CPC ............ B60H 1/00064; B60H 1/00842; B60H 2001/00135; B60H 1/00564;
(Continued)

(56) References Cited

U.S. PATENT DOCUMENTS

| 2009/0124187 | A1* | 5/2009 | Sievers | ............ B60H 1/00028 454/75 |
| 2012/0295529 | A1* | 11/2012 | Fukutomi | ......... B60H 1/00842 454/152 |
| 2016/0152110 | A1* | 6/2016 | Kim | .................. B60H 1/00664 165/203 |

FOREIGN PATENT DOCUMENTS

| JP | 2004106635 A | 4/2004 |
| JP | 2004130974 A | 4/2004 |

(Continued)

OTHER PUBLICATIONS

Written Opinion of International Searching Authority and International Search Report for International Application No. PCT/KR2018/006201; dated Sep. 18, 2018; 13 pages; English Translation for the International Search Report is Included.

*Primary Examiner* — Lionel Nouketcha
(74) *Attorney, Agent, or Firm* — Dickinson Wright PLLC

(57) ABSTRACT

The present invention relates to an air conditioner for a vehicle, which can send air-conditioned air toward a rear seat of the vehicle in order to perform air-conditioning of a front seat of the vehicle and air-conditioning of a rear seat. The air conditioner includes an air passageway formed in an air-conditioning case, wherein the air passageway includes: a rear seat cold air passageway which is a passageway that the air passed through the heat exchanger for cooling bypasses the heat exchanger for heating and flows toward a rear seat of the vehicle; and a warm air passageway which is a passageway that the air passed through the heat exchanger for cooling passes through the heat exchanger for (Continued)

heating and flows toward a front seat or the rear seat of the vehicle. The air conditioner includes a rear seat temperature adjusting door for controlling an amount of air flowing from the warm air passageway to the rear seat air outlet and an amount of air flowing from the rear seat cold air passageway to the rear seat air outlet.

14 Claims, 17 Drawing Sheets

(52) U.S. Cl.
CPC . *B60H 1/00564* (2013.01); *B60H 2001/0015* (2013.01); *B60H 2001/00092* (2013.01); *B60H 2001/00214* (2013.01); *B60H 2001/00242* (2013.01)

(58) Field of Classification Search
CPC ............ B60H 1/00271; B60H 1/00057; B60H 1/00507; B60H 1/00521; B60H 1/00557; B60H 1/0055
See application file for complete search history.

(56) References Cited

FOREIGN PATENT DOCUMENTS

| | | | |
|---|---|---|---|
| JP | 2008179175 A | 8/2008 |
| KR | 20060132184 A | 12/2006 |
| KR | 20150080236 A | 7/2015 |
| KR | 20150088577 A | 8/2015 |

* cited by examiner

PRIOR ART

PRIOR ART

PRIOR ART

VEHICLE AIR CONDITIONING APPARATUS

CROSS-REFERENCE TO RELATED APPLICATIONS

This application is a U.S. National Stage of International Patent Application Serial No. PCT/KR2018/006201, filed May 31, 2018, which claims the benefit of Korean Patent Application Serial No. 10-2017-0068767, filed Jun. 2, 2017, and Korean Patent Application Serial No. 10-2018-0058067, filed May 23, 2018. The entire disclosures of each of the above applications are incorporated herein by reference.

TECHNICAL FIELD

The present invention relates to an air conditioner for a vehicle, and more particularly, to an air conditioner for a vehicle, which can send air-conditioned air toward a rear seat of the vehicle in order to perform air-conditioning of a front seat of the vehicle and air-conditioning of a rear seat.

BACKGROUND ART

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

Korean Patent Publication No. 2015-0088577 (Aug. 3, 2015) discloses an air conditioner for a vehicle which controls positions of a rear seat temperature-adjusting door, an auxiliary rear seat temperature-adjusting door and a rear seat on-off door in order to regulate air volume of a rear seat. FIG. 1 is a sectional view of a conventional air conditioner for a vehicle. As shown in FIG. 1, the air conditioner for a vehicle includes an air-conditioning case 10, an evaporator 20, a heater core 30, a front seat temperature adjusting door 51, and a front seat mode door.

The air-conditioning case 10 includes an air inlet 11 and an air outlet, and an air passageway formed therein. A blower unit is connected to the air inlet 11 so that indoor air or outdoor air is selectively introduced into the air passageway formed inside the air-conditioning case 10. The air outlet includes a defrost vent 12, a face vent 13, a floor vent 114, a rear seat face vent 15, and a rear floor vent 16. The air passageway inside the air-conditioning case 10 includes a front seat cold air passageway P1, a warm air passageway P2, and a rear seat cold air passageway P3.

The evaporator 20 is a heat exchanger for cooling and cools air passing through the evaporator 20. The heater core 30 is a heat exchanger for heating and heats air passing through the heater core 30. The heater core 30 is arranged in the warm air passageway P2 which is located downstream of the evaporator 20 in an air flow direction. An electric heater 40, such as a PTC heater, may be further disposed in the warm air passageway P2. The front seat temperature adjusting door 51 is arranged between the evaporator 20 and the heater core 30 in order to adjust the degree of opening of the warm air passageway P2 passing the heater core 30 and the degree of opening of the cold air passageways P1 and P3 bypassing the heater core 30. The front seat mode door includes a defrost door 53, a vent door 54, and a floor door 55.

The rear seat air passageway includes the rear seat cold air passageway P3 that the air passing through the evaporator 20 bypasses the heater core 30 and a warm air passageway passing through the heater core 30. The warm air passageway of the rear seat air passageway is used together with the warm air passageway P2 of the front seat air passageway. That is, some of air passing through the heater core 30 and flowing in the warm air passageway P2 moves upwardly, and then, is discharged to at least one among the defrost vent 12, the face vent 13, and the floor vent 114, and the remainder of the air moves downwardly, and then, is discharged to at least one among the rear seat face vent 15 and the rear seat floor vent 16. A rear seat mode door 58 is disposed in the rear seat air passageway to adjust the degree of opening of the rear seat face vent 15 and the degree of opening of the rear seat floor vent 16.

The air-conditioning case 10 has a rear seat temperature adjusting door 52, an auxiliary rear seat temperature adjusting door 56, and a rear seat on-off door 57 which are disposed in the air-conditioning case 10. The rear seat temperature adjusting door 52 is disposed between the evaporator and the heater core 30 in order to adjust the degree of opening of a passageway flowing to the warm air passageway P2 and a passageway flowing to the rear seat cold air passageway P3. The auxiliary rear seat temperature adjusting door 56 is arranged downstream of the heater core 30 in the air flow direction in order to adjust the degree of opening of a passageway flowing to the rear seat air outlet. The rear seat on-off door 57 adjusts the degree of opening of the rear seat cold air passageway P3.

FIG. 2 is a view showing a front and rear seat cooling mode of the conventional air conditioner for a vehicle. Referring to FIG. 2, in the front and rear seat cooling mode, the front seat temperature adjusting door 51 closes the warm air passageway P2 and opens the front seat cold air passageway P1, and the rear seat temperature adjusting door 52 closes the warm air passageway P2 and opens the rear seat cold air passageway P3. The auxiliary rear seat temperature adjusting door 56 closes a passageway flowing to the rear seat air outlet, and the rear seat on-off door 57 opens the rear seat cold air passageway P3. The air cooled while passing through the evaporator 20 bypasses the heater core 30, and then, some of the air passes through the front seat cold air passageway P1 and is discharged to at least one among the front seat air outlets, and the rest of the air passes through the rear seat cold air passageway P3 and is discharged to at least one among the rear seat air outlets.

FIG. 3 is a view showing a front and rear seat heating mode of the conventional air conditioner for a vehicle. Referring to FIG. 3, in the front and rear seat heating mode, the front seat temperature adjusting door 51 closes the front seat cold air passageway P1 and opens the warm air passageway P2, and the rear seat temperature adjusting door 52 closes the rear seat cold air passageway P3 and opens the warm air passageway P2. The auxiliary rear seat temperature adjusting door 56 opens the passageway flowing to the rear seat air outlet, and the rear seat on-off door 57 closes the rear seat cold air passageway P3. The air passed through the evaporator 20 is heated while passing through the heater core 30, and then, some of the heated air moves upwards and is discharged to at least one among the front seat air outlets, and the rest of the heated air moves downwards and is discharged to at least one among the rear seat air outlets.

The conventional air conditioner for a vehicle controls temperature of the front seat of the vehicle through the front seat temperature adjusting door 51, and controls temperature of the rear seat of the vehicle through the rear seat temperature adjusting door 52 and the auxiliary rear seat temperature adjusting door 56. That is, the rear seat temperature adjusting door 52 and the auxiliary rear seat temperature adjusting door 56 are linked with each other in order to control temperature of the rear seat of the vehicle by adjusting the degree of opening of the rear seat cold air passageway P3 and the degree of opening of the warm air passageway P2. In this instance, the auxiliary rear seat temperature adjusting door 56 gets involved in an ON/OFF action of the rear seat cold air passageway P3.

Finally, the conventional air conditioner for a vehicle requires three doors for adjusting temperature of the rear seat, and it results in increase of the number of doors and the number of actuators for actuating the doors, and rises in costs and weight of the air conditioner.

Moreover, in case of the conventional air conditioner for a vehicle, the rear seat mode door 58 can change only the direction of the discharged air and does not discharge air toward the rear seat if the rear seat on-off door 57 is turned off even though the rear seat temperature adjusting door 52 is in the cooling mode. That is, because the rear seat on-off door 57 gets involved in the on-off action of the air volume, it is required to precisely adjust the temperature adjusting doors and the mode doors.

DISCLOSURE

Technical Problem

Accordingly, the present invention has been made to solve the above-mentioned problems occurring in the prior arts, and it is an object of the present invention to provide an air conditioner for a vehicle which can reduce the number of doors and actuators and control modes and perform on-off actions by just one door.

It is another object of the present invention to provide an air conditioner for a vehicle which can reduce the number of doors, show various air-conditioning modes without deterioration of air-conditioning performance, and provide optimized controls of mode doors.

Technical Solution

To accomplish the above object, according to the present invention, there is provided an air conditioner for a vehicle which includes an air-conditioning case having an air passageway formed therein, and a heat exchanger for cooling and a heat exchanger for heating which are disposed in the air passageway of the air-conditioning case to exchange heat with air passing through the air passageway, wherein the air passageway includes: a rear seat cold air passageway which is a passageway that the air passed through the heat exchanger for cooling bypasses the heat exchanger for heating and flows toward a rear seat of the vehicle; and a warm air passageway which is a passageway that the air passed through the heat exchanger for cooling passes through the heat exchanger for heating and flows toward a front seat or the rear seat of the vehicle, and the air conditioner includes a rear seat temperature adjusting door for controlling an amount of air flowing from the warm air passageway to the rear seat air outlet and an amount of air flowing from the rear seat cold air passageway to the rear seat air outlet.

In another aspect of the present invention, there is provided an air conditioner for a vehicle including: an air-conditioning case having an air passageway formed therein; a heat exchanger for cooling and a heat exchanger for heating which are disposed in the air passageway of the air-conditioning case to exchange heat with air passing through the air passageway; a front seat temp door for adjusting the degree of opening between a part of a front seat cold air passageway and a part of a warm air passageway; a first rear seat temp door arranged between the heat exchanger for cooling and the heat exchanger for heating to adjust the degree of opening of another part of the warm air passageway; a second rear seat temp door arranged downstream of the heat exchanger for heating to adjust the degree of opening between the warm air passageway and the rear seat cold air passageway; and a rear seat mode door arranged downstream of the second rear seat temp door to adjust the degree of opening of the rear seat air outlet.

Advantageous Effects

The air conditioner for a vehicle according to the present invention can adjust temperature of the rear seat through the dome-shaped rear seat temperature adjusting door, optimize location and shape of the dome-shaped door through one door and one actuator, and secure an additional flow channel to perform heating and cooling, thereby reducing the number of components, costs and weight.

Moreover, because the air conditioner includes the rear seat temperature adjusting door, which is one dome-shaped door, and the rear seat mode door, which is one rotary type door, the air conditioner according to the present invention can reduce the number of doors and actuators for actuating the doors and sufficiently perform the cooling mode, the heating mode and various air-conditioning modes, namely, the vent mode, the floor mode, the bi-level mode, and the off mode.

Furthermore, the air conditioner for a vehicle according to the present invention can realize a three-zone air conditioner which can reduce the number of doors and perform control of the rear seat air-conditioning smoothly. Therefore, the air conditioner for a vehicle according to the present invention can reduce the number of the components, manufacturing costs, and weight and volume of the air conditioner.

Additionally, because the location of the first rear seat temp door is changed according to the front seat conditions, the air conditioner for a vehicle according to the present invention can maximize performance of the heater core at the front seat by guiding all of the air to flow to the warm air passageway P2 so as to enhance heating performance.

In addition, because the first rear seat temp door guides the air existing in the dome toward the warm air passageway in the case that the front seat temp door is not in the maximum cooling mode of the front seat, the inner face of the streamlined dome can guide the air passed through the evaporator toward the heater core of the warm air passageway more smoothly.

MODE FOR INVENTION

Figure 1:
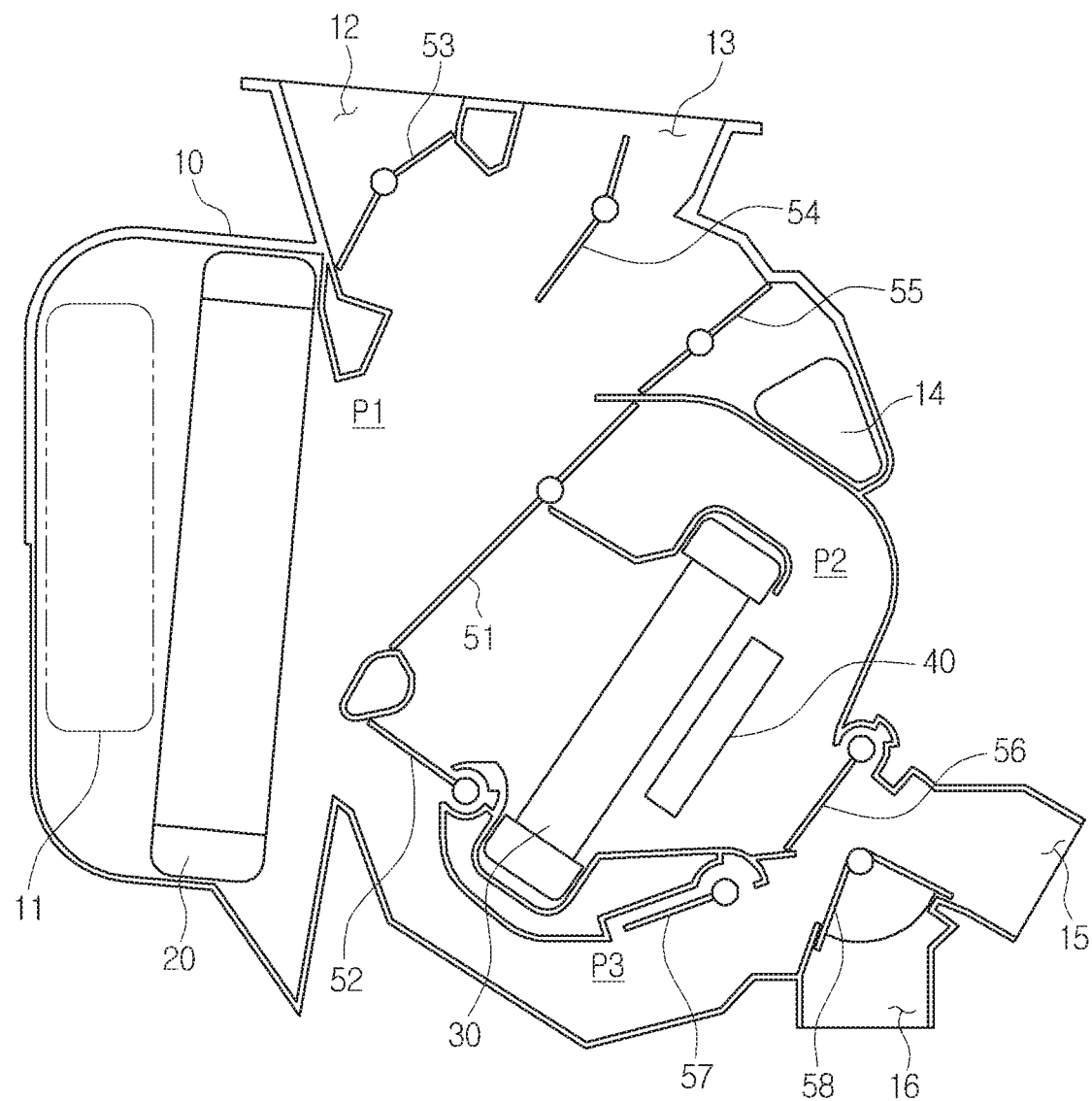
FIG. 1 is a sectional view of a conventional air conditioner for a vehicle.
Figure 2:
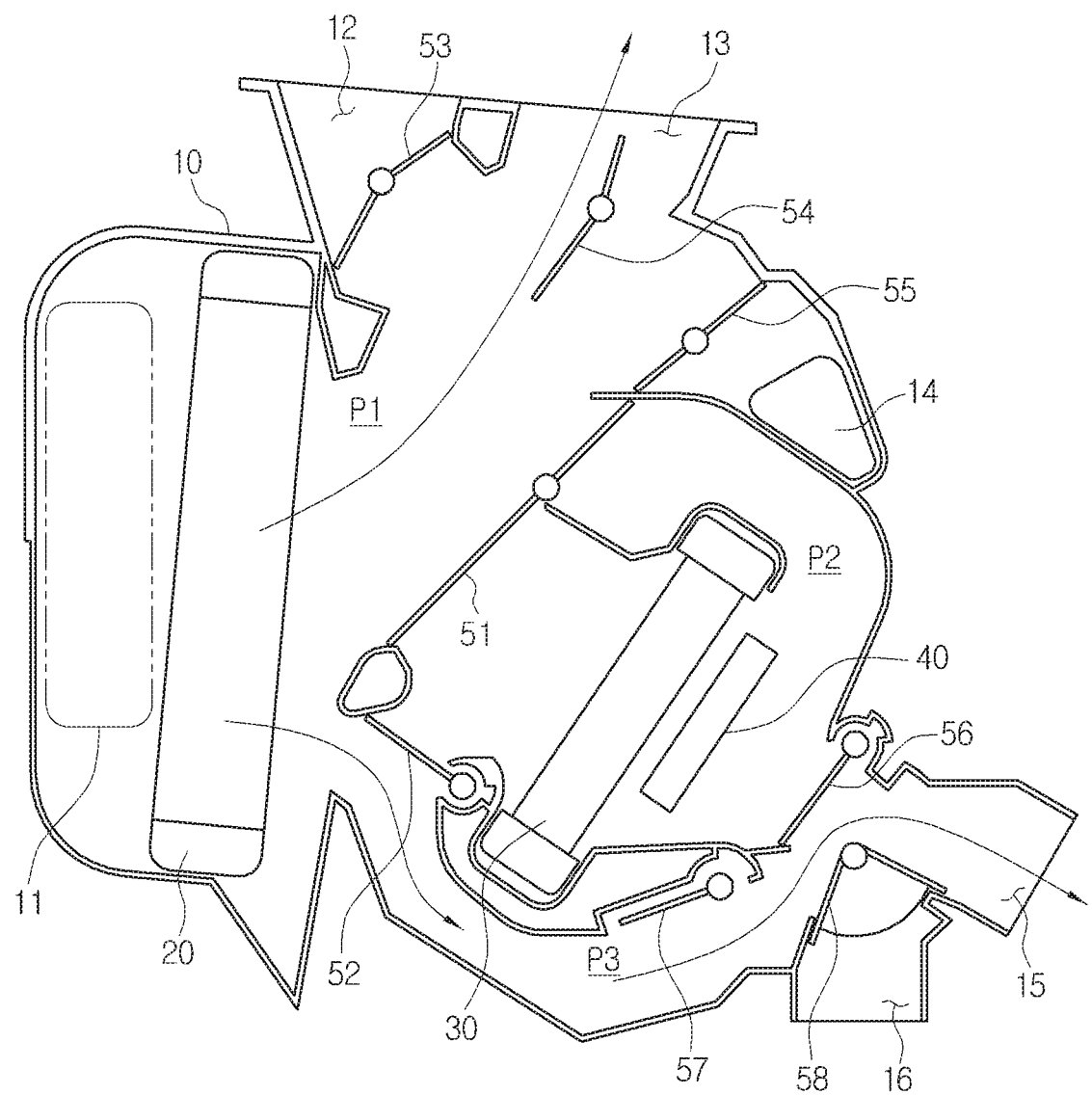
FIG. 2 is a view showing a front and rear seat cooling mode of the conventional air conditioner for a vehicle.
Figure 3:
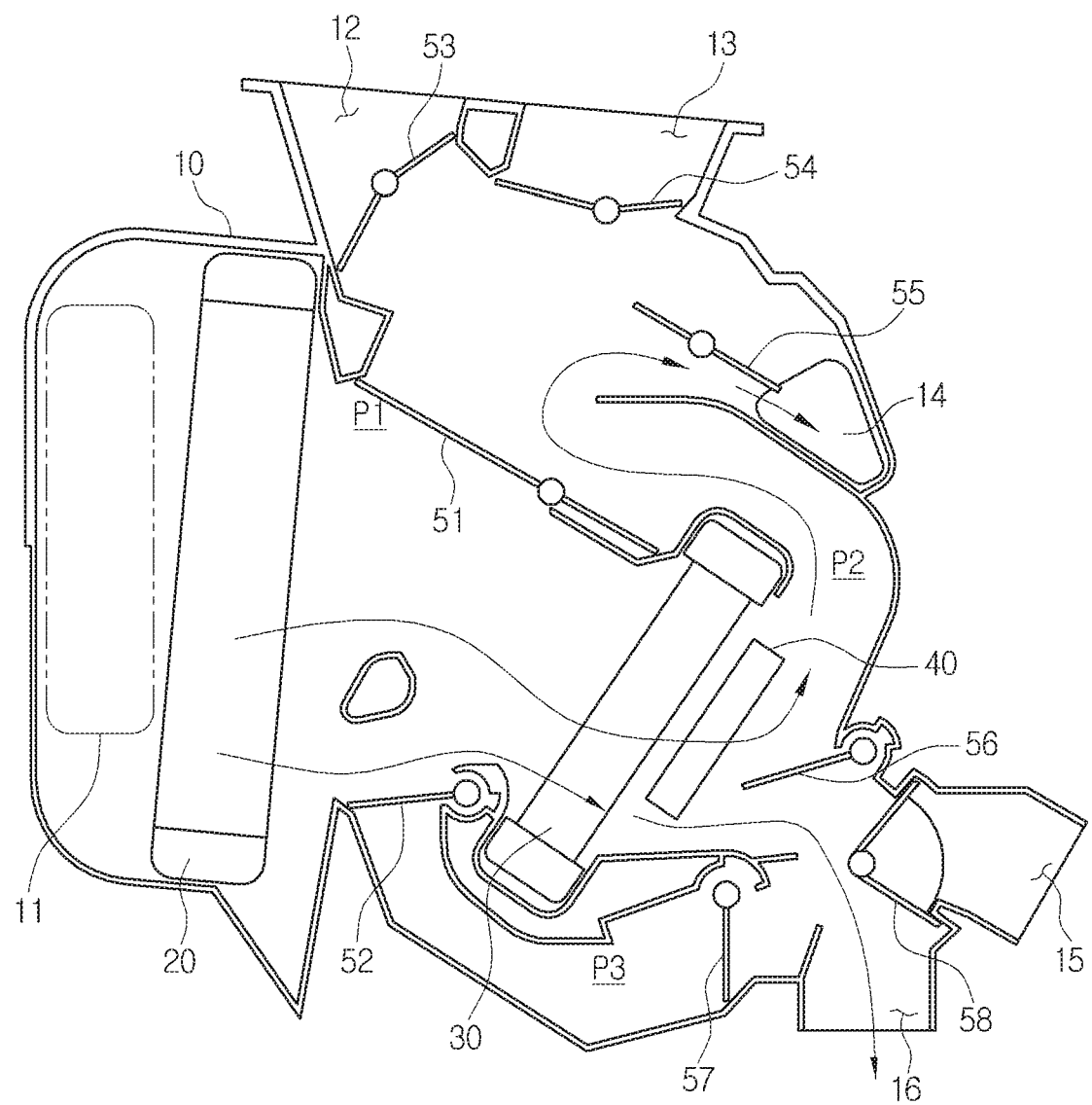
FIG. 3 is a view showing a front and rear seat heating mode of conventional air conditioner for a vehicle.
Figure 4:
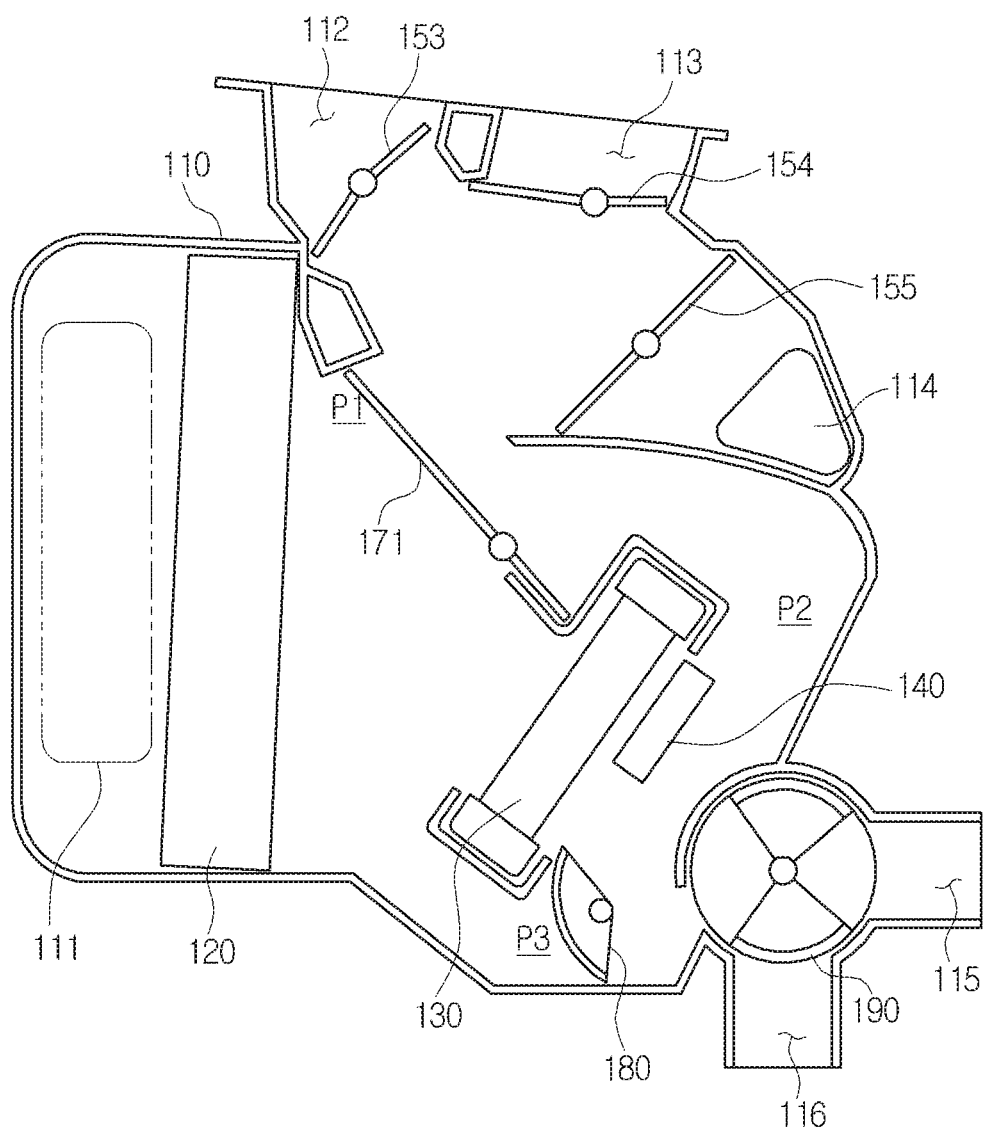
FIG. 4 is a sectional view of an air conditioner for a vehicle according to a first preferred embodiment of the present invention.
Figure 5:
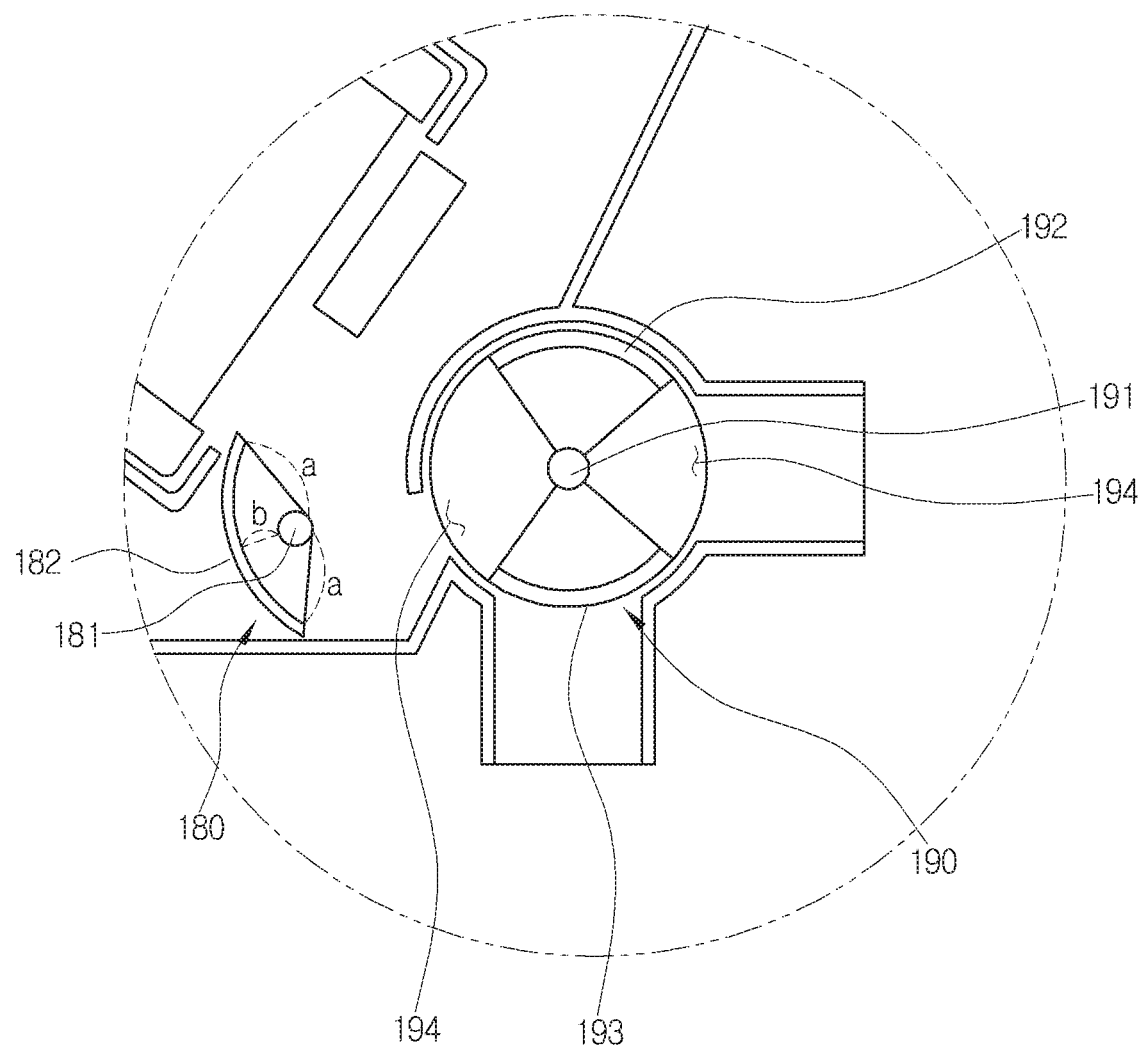
FIG. 5 is an enlarged sectional view of a rear seat air outlet of the air conditioner for a vehicle according to the preferred embodiment of the present invention.

FIG. 4 is a sectional view of an air conditioner for a vehicle according to a first preferred embodiment of the present invention, and FIG. 5 is an enlarged sectional view of a rear seat air outlet of the air conditioner for a vehicle according to the preferred embodiment of the present invention;

As shown in FIGS. 4 and 5, the air conditioner for a vehicle according to the preferred embodiment of the present invention includes: an air-conditioning case 110 having an air passageway formed therein; and a heat exchanger for cooling and a heat exchanger for heating disposed in the air passageway of the air-conditioning case 110 to exchange heat with air passing through the air passageway.

The air-conditioning case 110 includes an air inlet 111, air outlets, and the air passageway formed therein. A blower unit is connected to the air inlet 111 so that indoor air or outdoor air are selectively introduced into the air passageway of the air-conditioning case 110. The air outlets are a front seat air outlet having a defrost vent 112, a front seat face vent 113 and a front seat floor vent 114, and a rear seat air outlet having a rear seat face vent 115 and a rear seat floor vent 116. The air passageway inside the air-conditioning case 110 includes a front seat cold air passageway P1, a warm air passageway P2, and a rear seat cold air passageway P3.

The heat exchanger for cooling is an evaporator 120. The evaporator 120 cools air by exchanging heat between refrigerant flowing in the evaporator 120 and air passing through the evaporator 120. The heat exchanger for heating is a heater core 130. The heater core 130 heats air by exchanging heat between cooling water flowing in the heater core 130 and air passing through the heater core 130. The heater core 130 is arranged in a warm air passageway P2, which is located downstream of the evaporator 120 in an air flow direction. An electric heater 140, such as a PTC heater, may be further disposed in the warm air passageway P2.

The air-conditioning case 110 has a front seat air outlet for discharging air toward a front seat of the vehicle, and the front seat air outlet is controlled in the degree of opening by a front seat mode door. The front seat mode door includes a defrost door 153 for adjusting the degree of opening of the defrost vent 112, a vent door 154 for adjusting the degree of opening of the front seat face vent 113, and a floor door 155 for adjusting the degree of opening of the front seat floor vent 114. Furthermore, the air-conditioning case 110 has a rear seat air outlet for discharging air toward a rear seat of the vehicle. The rear seat air outlet includes a plurality of vents for discharging air toward parts of the rear seat of the vehicle, namely, a rear seat face vent 115 and a rear seat floor vent 116.

The air passageway in the air-conditioning case 110 includes a front seat cold air passageway P1, a rear seat cold air passageway P3, and a warm air passageway P2. The front seat cold air passageway P1 is a passageway that air passing through the evaporator 120 bypasses the heater core 130 and flows toward the front seat of the vehicle. The rear seat cold air passageway P3 is a passageway that the air passing through the evaporator 120 bypasses the heater core 130 and flows toward the rear seat of the vehicle. The warm air passageway P2 is a passageway that the air passing through the evaporator 120 passes through the heater core 130 and flows toward the front seat or the rear seat of the vehicle.

The air conditioner for a vehicle includes a front seat temperature adjusting door 171, a rear seat temperature adjusting door 180, and a rear seat mode door 190.

The front seat temperature adjusting door 171 controls the degree of opening of the front seat cold air passageway P1 and the degree of opening of the warm air passageway P2. The front seat temperature adjusting door 171 selectively controls the air passed the evaporator 20 to bypass the heater core 130 or to pass through the heater core 130 so as to control temperature of the air discharged to the interior of the vehicle. The front seat temperature adjusting door 171 may be formed singly or plurally.

The rear seat temperature adjusting door 180 controls an amount of air flowing from the warm air passageway P2 to the rear seat air outlet and an amount of air flowing from the rear seat cold air passageway P3 to the rear seat air outlet.

The rear seat temperature adjusting door 180 is formed in a dome type. The rear seat temperature adjusting door 180 is mounted to rotate around a rotary shaft 181 inside the air-conditioning case 110. A dome-shaped part 182 is arranged to be spaced apart from the rotary shaft 181 in a radial direction, and is supported on the rotary shaft 181 by a side plate part. The dome-shaped part 182 performs a blocking function to close the air passageway and a guiding function to smoothly move the air toward the rear seat air outlet.

The rear seat temperature adjusting door 180 controls the degree of opening between the warm air passageway P2 and the rear seat cold air passageway P3 downstream of the heater core 130 in an air flow direction. The rear seat temperature adjusting door 180 guides the air of the warm air passageway P2 toward the rear seat air outlet along an inner face of the dome-shaped part 182 when closing the rear seat cold air passageway P3.

As described above, compared with the conventional structure requiring at least three doors and two actuators, the dome-shaped rear seat temperature adjusting door 180 optimizes location and shape of the dome-shaped door through one door and one actuator and secures an additional flow channel to perform heating and cooling, thereby reducing the number of components, costs and weight.

Figure 6:
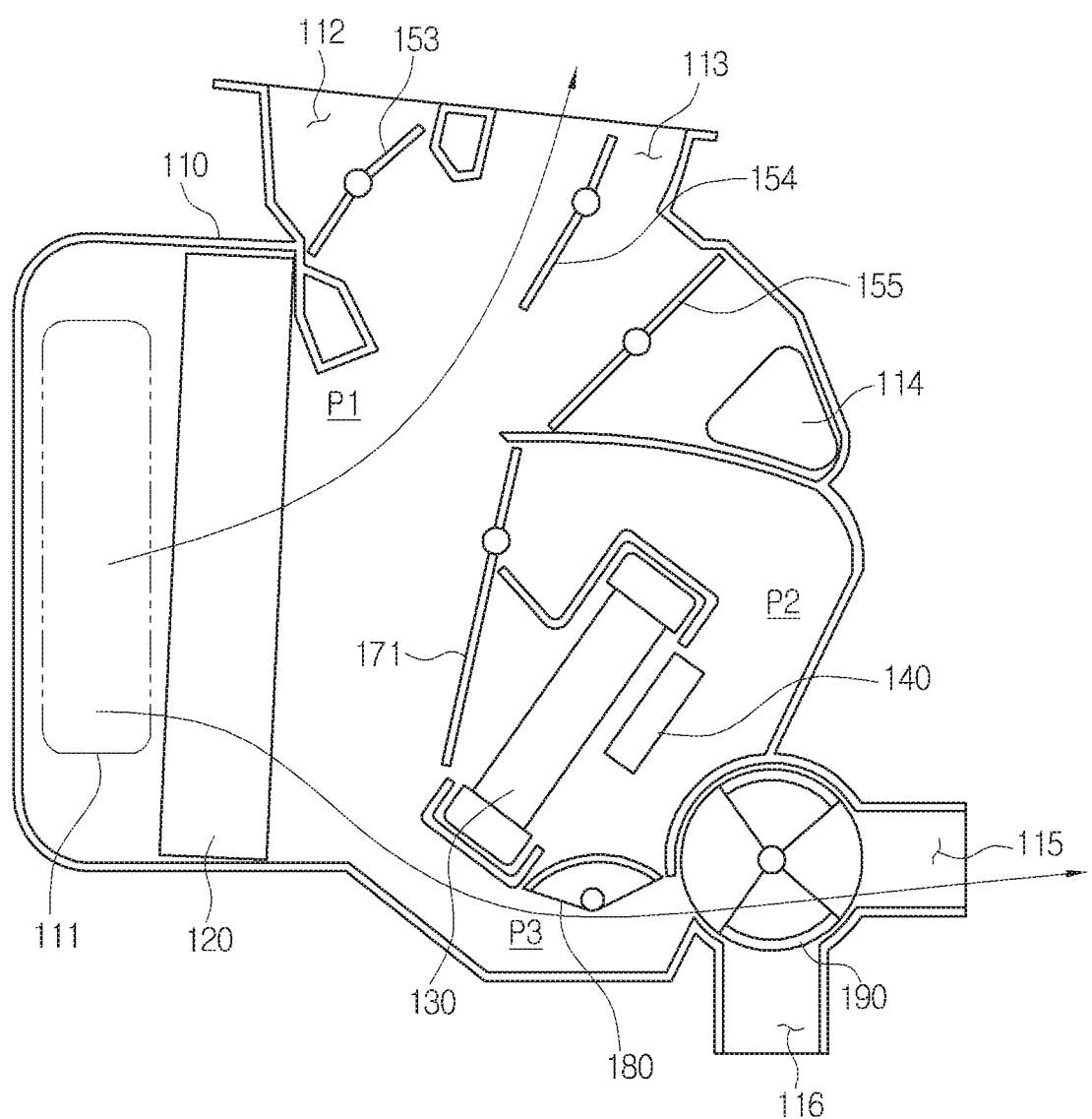
FIG. 6 is a view showing a front and rear seat cooling mode of the air conditioner for a vehicle according to the preferred embodiment of the present invention.

FIG. 6 is a view showing a front and rear seat cooling mode of the air conditioner for a vehicle according to the preferred embodiment of the present invention.

Referring to FIG. 6, in the front and rear seat cooling mode, the front seat temperature adjusting door 171 opens the front seat cold air passageway P1 and closes the warm air passageway P2. Moreover, the rear seat temperature adjusting door 180 closes between the warm air passageway P2 and the rear seat cold air passageway P3 downstream of the heater core 130 in the air flow direction. The air cooled while passing through the evaporator 120 bypasses the heater core 130, and some of the air passes through the front seat cold air passageway P1 and is discharged to at least one among the front seat air outlets and the rest of the air passes through the rear seat cold air passageway P3 and is discharged to at least one among the rear seat air outlets.

Figure 7:
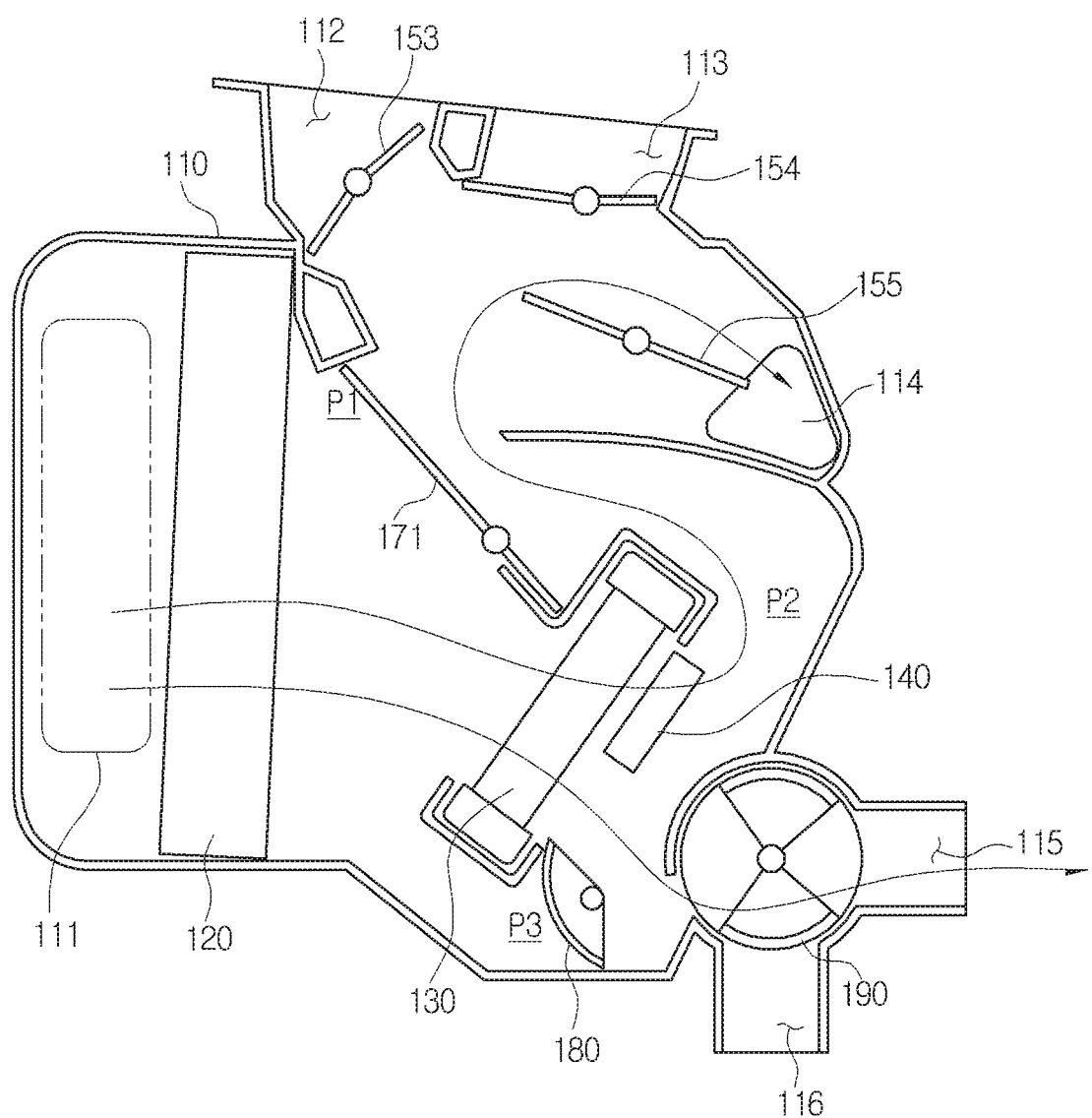
FIG. 7 is a view showing a front and rear seat heating mode of the air conditioner for a vehicle according to the preferred embodiment of the present invention.

FIG. 7 is a view showing a front and rear seat heating mode of the air conditioner for a vehicle according to the preferred embodiment of the present invention.

Referring to FIG. 7, in the front and rear seat heating mode, the front seat temperature adjusting door 171 closes the front seat cold air passageway P1 and opens the warm air passageway P2. Additionally, the rear seat temperature adjusting door 180 opens between the warm air passageway P2 and the rear seat cold air passageway P3 downstream of the heater core 130 in the air flow direction, and closes the rear seat cold air passageway P3. The air passed through the evaporator 120 is heated while passing through the heater core 130, and some of the air moves upwards and is discharged to at least one among the front seat air outlets and the rest of the air moves downwards and is discharged to at least one among the rear seat air outlets. In this instance, the heated air passed through the heater core 130 is guided toward the rear seat air outlet along the inner face of the dome-shaped part 182 of the rear seat temperature adjusting door 180.

The rear seat mode door 190 is formed singly, and selectively moves the air inside the air-conditioning case 110 to at least one among the rear seat air outlets. The rear seat mode door 190 performs an on-off action to open or block the air passageway toward the rear seat air outlet.

The rear seat mode door 190 is formed in a rotary type. The rear seat mode door 190 is mounted to rotate around a rotary shaft 191 in the air-conditioning case 110. The rear seat mode door 190 is formed in a cylindrical shape, and includes a first rotary part 192 and a second rotary part 193 which are opposite to each other based on the rotary shaft 191. Opening parts 194 are formed between the first rotary part 192 and the second rotary part 193.

The rear seat air outlet includes a first vent and a second vent formed perpendicularly to the first vent. That is, the first vent is a rear seat face vent 115, and the second vent is a rear seat floor vent 116. As described above, the rear seat mode door 190 having the opening parts 194 formed at both sides is formed between the first rotary part 192 and the second rotary part 193 which are opposite to each other to optimize locations of the vents of the rear seat air outlets, so that the air conditioner can perform various air-conditioning modes and the on-off function through just one door.

In a rear seat off mode to block the air from being discharged to the rear seat air outlet, the first rotary part 192 and the second rotary part 193 close all of the rear seat air outlets to have a double sealing structure. The first rotary part 192 and the second rotary part 193 are longer than diameters of a passageway of the rear seat face vent 115 and a passageway of the rear seat floor vent 116. That is, the rotary parts protrude more than the vents in a state where the vents are covered. Through the above structure, a floor mode can be formed. When the rear seat mode door 190 is rotated more in the floor mode, an off mode can be performed to close all of the rear seat floor vent 116 and the rear seat face vent 115.

In the meantime, the rotary shaft 181 of the rear seat temperature adjusting door 180 is arranged between the heater core 130 and the rear seat mode door 190. Moreover, the dome-shaped part 182 of the rear seat temperature adjusting door 180 is arranged toward the heater core 130 to be operated. Through the above structure, a space of a rear seat mixing zone is increased, and an increase in air volume toward the rear seat may be achieved.

Additionally, the rear seat temperature adjusting door 180 is formed such that a length (b) from the rotary shaft 181 to the center of the dome-shaped part 182 is shorter than a length (a) from the rotary shaft 181 to both ends of the dome-shaped part 182. That is, the rear seat temperature adjusting door 180 has the dome-shaped structure and is flatter than a round dome shape so as to reduce a back-and-forth width of the vehicle. Therefore, the air conditioner can reduce a package of the HVAC.

Figure 8:
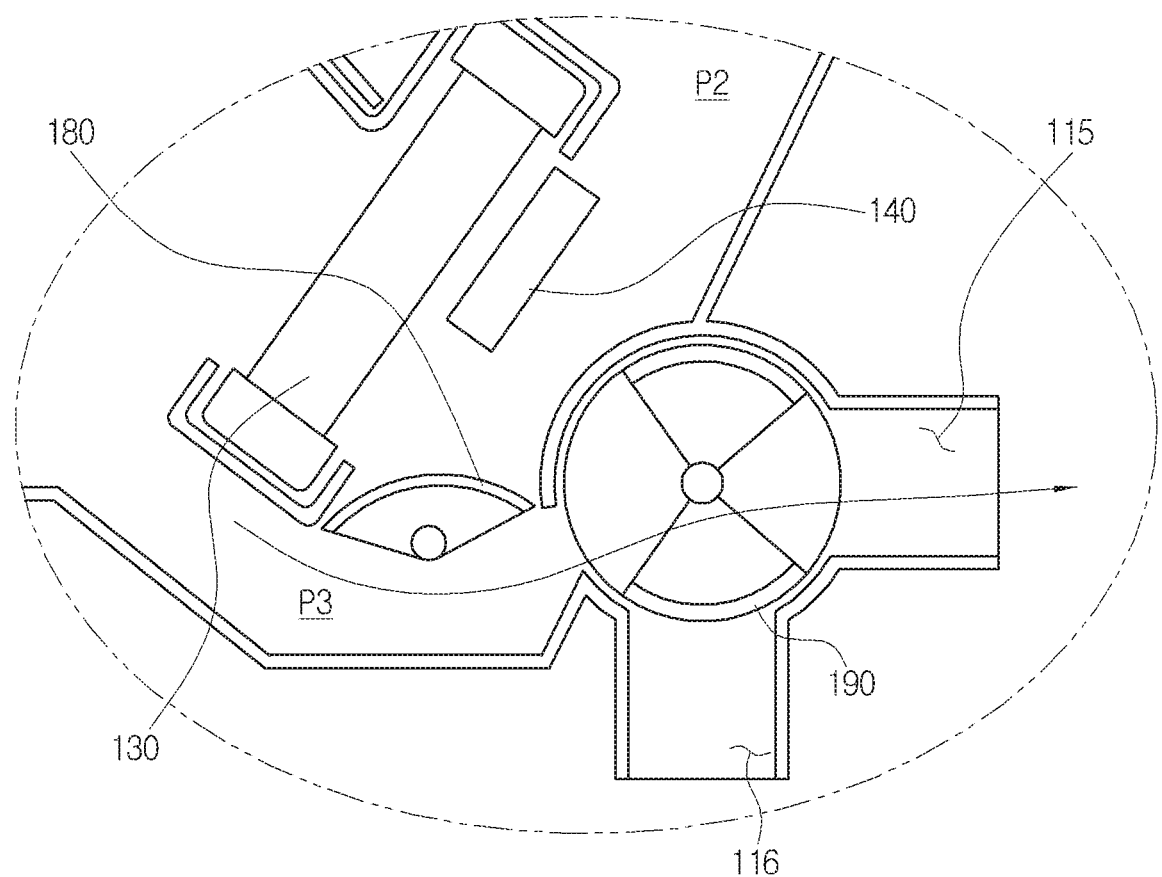
FIG. 8 is a view showing a rear seat vent mode of the air conditioner for a vehicle according to the preferred embodiment of the present invention.

FIG. 8 is a view showing a rear seat vent mode of the air conditioner for a vehicle according to the preferred embodiment of the present invention. Referring to FIG. 8, in the rear seat vent mode (console vent mode), the first rotary part closes the rear seat floor vent 116. The air-conditioned wind passes through the opening parts of the rear seat mode door 190 and is discharged to the rear seat face vent 115.

Figure 9:
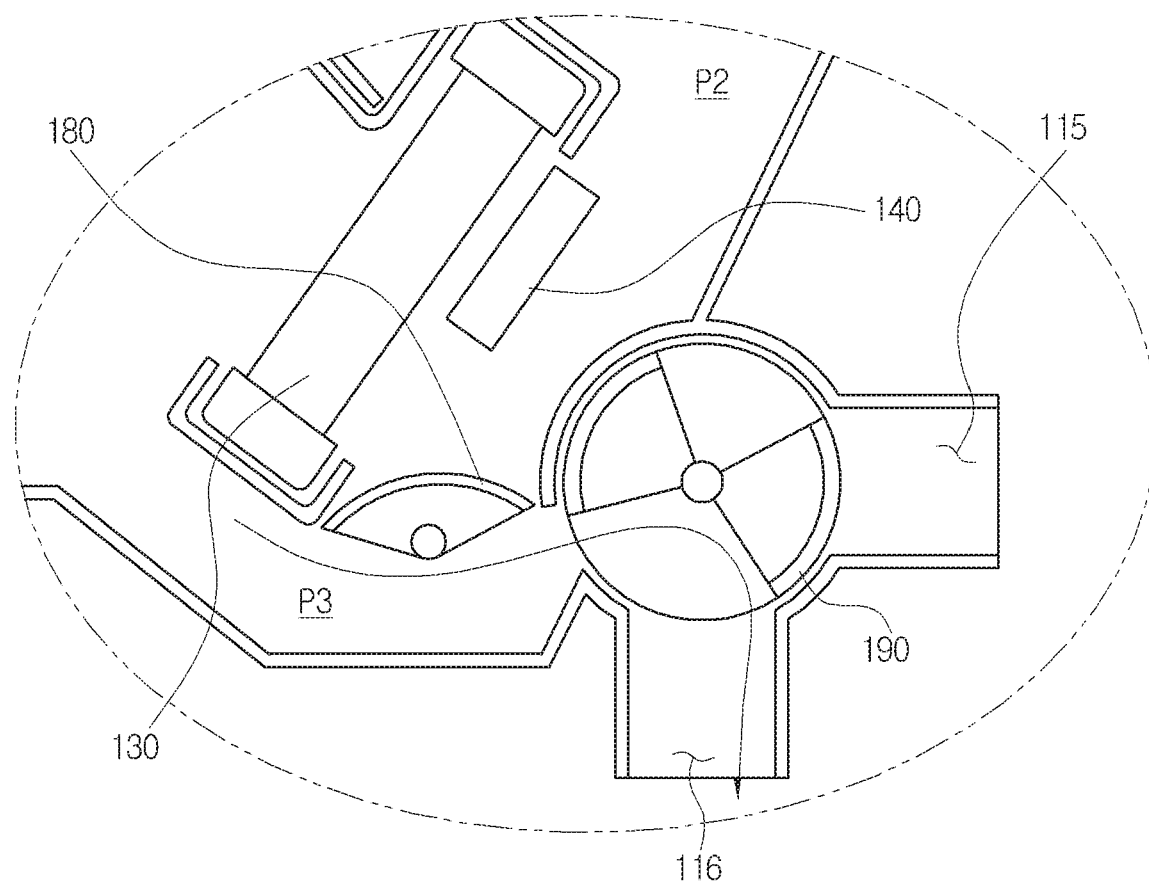
FIG. 9 is a view showing a rear seat floor mode of the air conditioner for a vehicle according to the preferred embodiment of the present invention.

FIG. 9 is a view showing a rear seat floor mode of the air conditioner for a vehicle according to the preferred embodiment of the present invention. Referring to FIG. 9, in the rear floor mode, the first rotary part closes the rear seat face vent 115. The air-conditioned wind passes through one opening part of the rear seat mode door 190 and is discharged to the rear seat floor vent 116.

Figure 10:
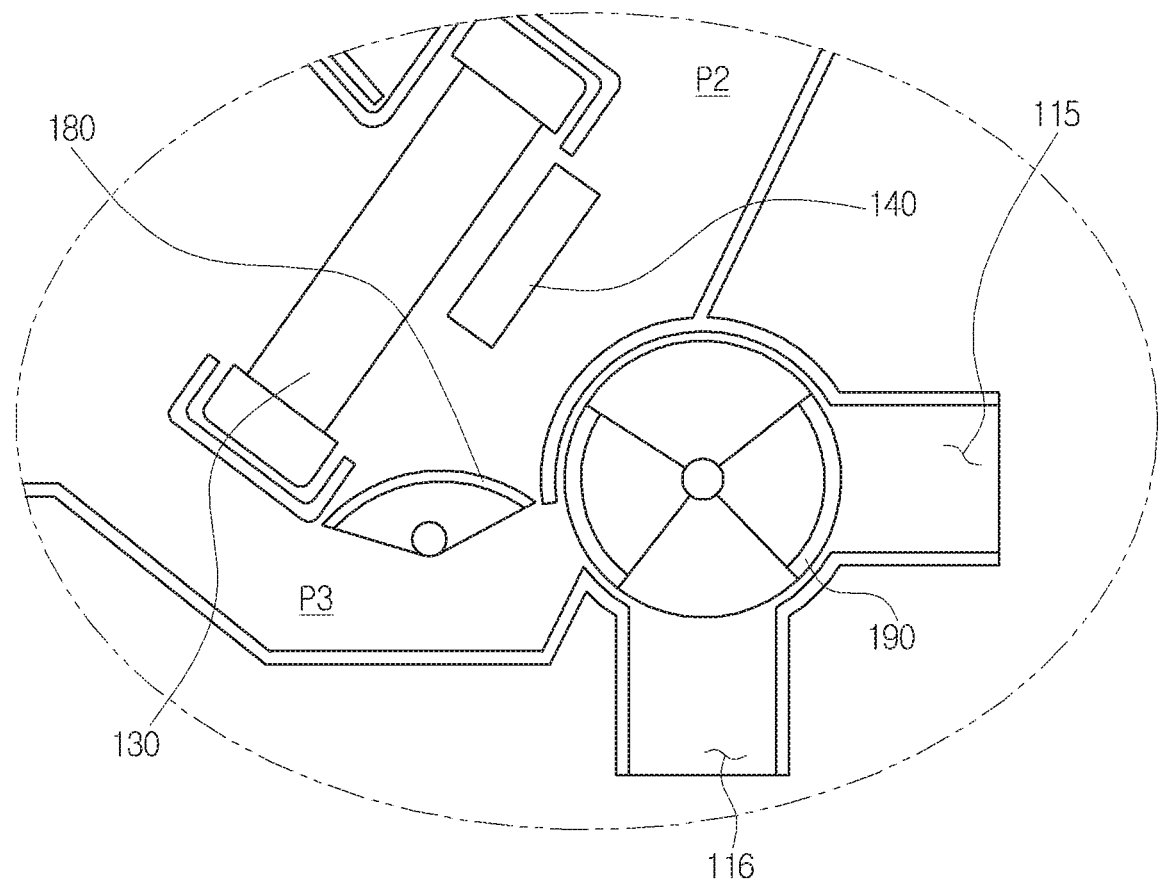
FIG. 10 is a view showing rear seat off mode of the air conditioner for a vehicle according to the preferred embodiment of the present invention.

FIG. 10 is a view showing rear seat off mode of the air conditioner for a vehicle according to the preferred embodiment of the present invention. Referring to FIG. 10, in the rear seat off mode, the first rotary part closes the rear seat face vent 115, and the second rotary part closes the rear seat cold air passageway P3. Through the above structure, the rear seat face vent 115 has a double sealing structure to prevent undesirable wind from being discharged toward a rear seat passenger's face.

Figure 11:
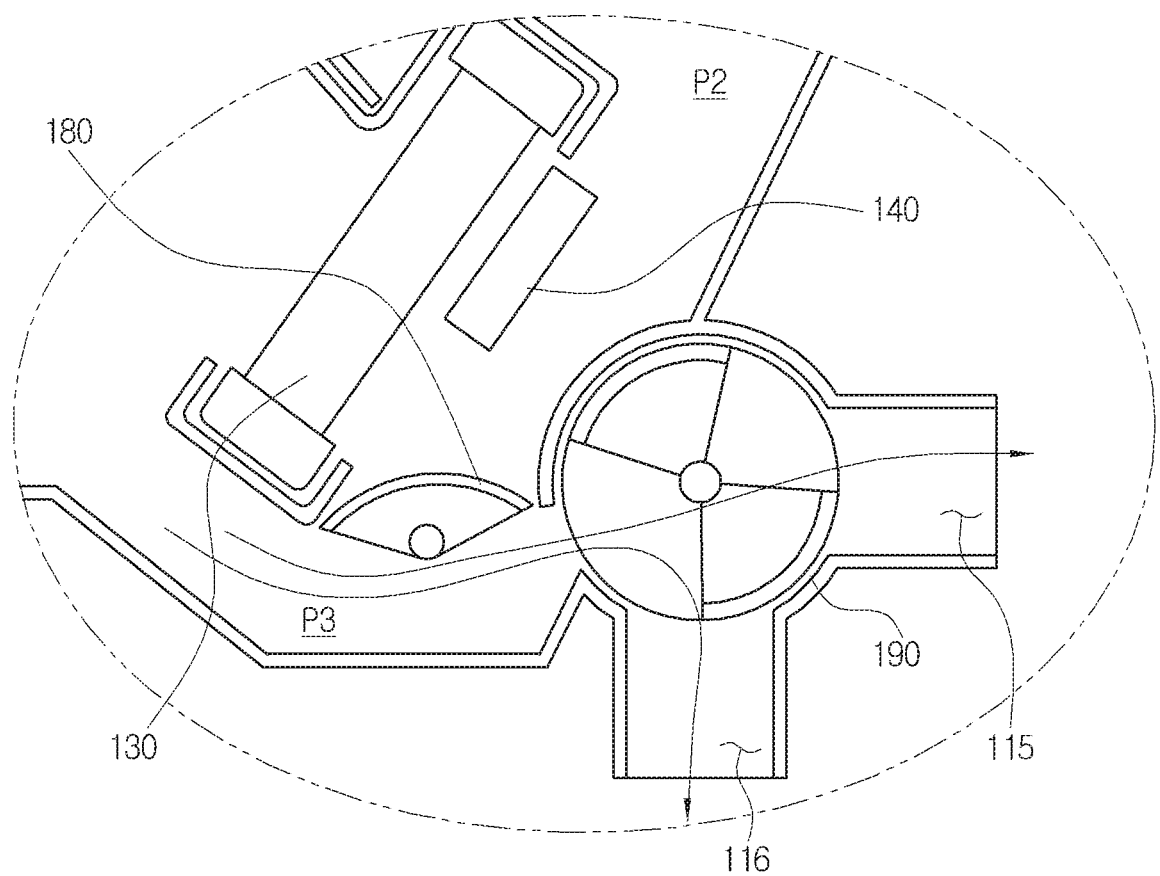
FIG. 11 is a view showing a rear seat bi-level mode of the air conditioner for a vehicle according to the preferred embodiment of the present invention.

FIG. 11 is a view showing a rear seat bi-level mode of the air conditioner for a vehicle according to the preferred embodiment of the present invention. Referring to FIG. 11, in the rear seat bi-level mode, the first rotary part closes a part of the rear seat face vent 115 and a part of the rear seat floor vent 116. The air-conditioned wind passes through one opening part of the rear seat mode door 190, some of the wind is discharged to the rear seat floor vent 116, and the rest of the wind passes through the other opening part and is discharged to the rear seat face vent 115.

As described above, because the air conditioner includes the rear seat temperature adjusting door 180, which is one dome-shaped door, and the rear seat mode door 190, which is one rotary type door, the air conditioner according to the present invention can reduce the number of doors and actuators for actuating the doors and sufficiently perform the cooling mode, the heating mode and various air-conditioning modes, namely, the vent mode, the floor mode, the bi-level mode, and the off mode.

Figure 12:
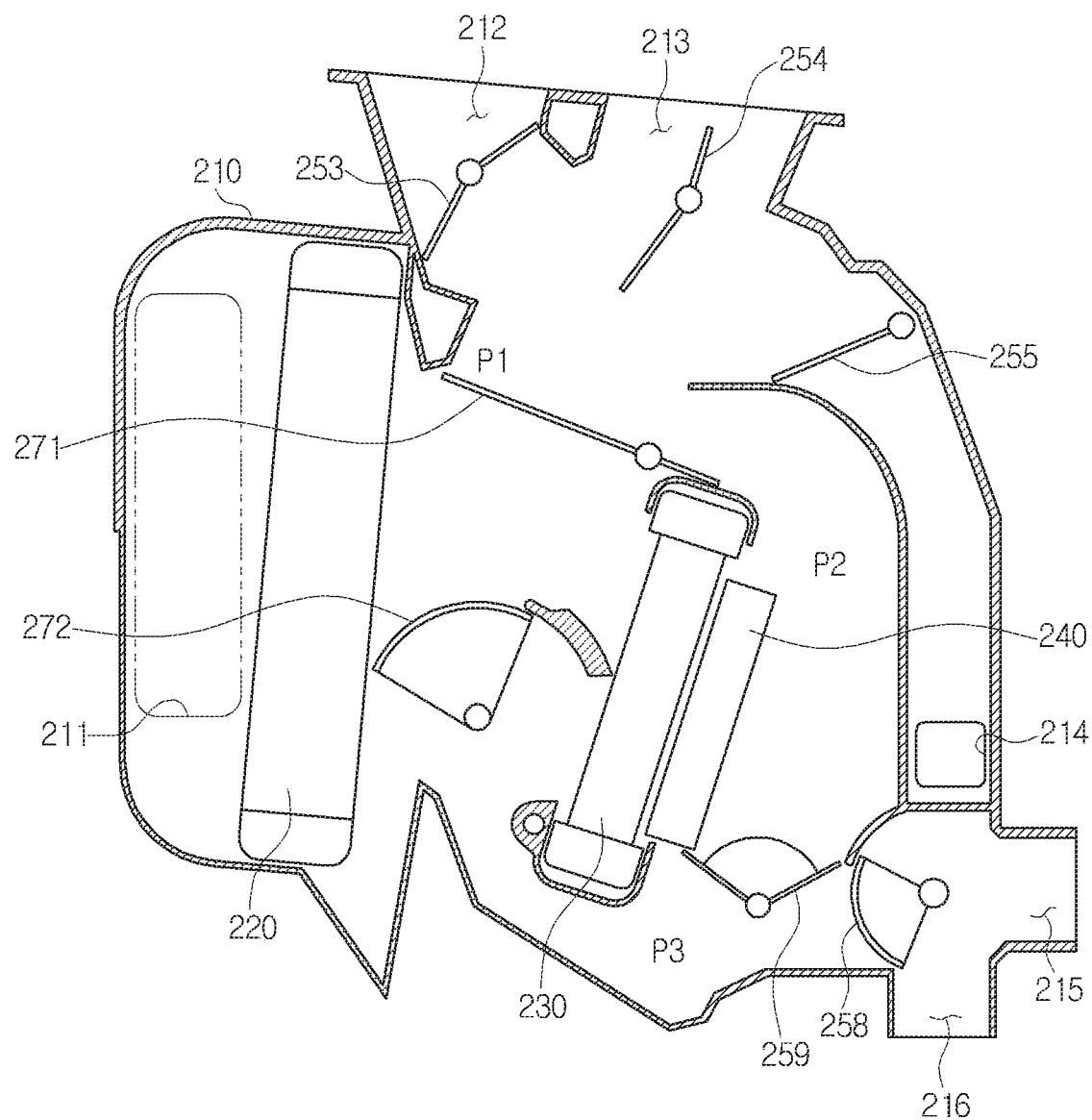
FIG. 12 is a sectional view showing an air conditioner for a vehicle according to a second preferred embodiment of the present invention.

FIG. 12 is a sectional view showing an air conditioner for a vehicle according to a second preferred embodiment of the present invention. As shown in FIG. 12, the air conditioner for a vehicle according to the second preferred embodiment of the present invention includes an air-conditioning case 210 having an air passageway formed therein, and a heat exchanger for cooling and a heat exchanger for heating which are disposed in the air passageway of the air-conditioning case 210 to exchange heat with air passing through the air passageway.

The air-conditioning case 210 has an air inlet 211 and air outlets, and the air passageway formed therein. The air outlets include a front seat air outlet having a defrost vent 212, a front seat face vent 213 and a front seat floor vent 214, and a rear seat air outlet having a console vent 215 and a rear seat floor vent 216. The heat exchanger for cooling is an evaporator 220, and the heat exchanger for heating is a heater core 230. An electric heater 40, such as a PTC heater, may be further disposed in the warm air passageway P2.

The air passageway in the air-conditioning case 210 includes a front seat cold air passageway P1, a warm air passageway P2, and a rear seat cold air passageway P3. The air passageway downstream of the evaporator 220 is divided into the front seat cold air passageway P1, the warm air passageway P2, and the rear seat cold air passageway P3. The front seat cold air passageway P1, the warm air passageway P2, and the rear seat cold air passageway P3 are formed in order from top to bottom, and the warm air passageway P2 formed vertically is arranged between the front seat cold air passageway P1 and the rear seat cold air passageway P3.

The air-conditioning case 210 has a front seat air outlet for discharging air toward the front seat of the vehicle, and the front seat air outlet is controlled in the degree of opening by a front seat mode door. The front seat mode door includes a defrost door 253 for adjusting the degree of opening of the defrost vent 212, a vent door 254 for adjusting the degree of opening of the front seat face vent 213, and a floor door 255 for adjusting the degree of opening of the front seat floor vent 214. Moreover, the air-conditioning case 210 has a rear seat air outlet for discharging air toward the rear seat of the vehicle, and the rear seat air outlet is controlled in the degree of opening by the rear seat mode door 258.

The air conditioner for a vehicle has a front seat temp door 271. The front seat temp door 271 adjusts the degree of opening between a part of the front seat cold air passageway P1 and a part of the warm air passageway P2. The front seat temp door 271 is arranged at downstream side adjacent to the evaporator 220 and is located at a boundary where the front seat cold air passageway P1 and the warm air passageway P2 branch off. The front seat temp door 271 is a tail door having plate members formed at both sides around a rotary shaft which is a driving shaft.

That is, the front seat temp door 271 has a rotary shaft, a first door part, and a second door part. The rotary shaft of the front seat temp door 271 is mounted adjacent to a lower end of an outlet of the warm air passageway P2. The first door part is formed at one side around the rotary shaft to adjust the degree of opening of upper parts of inlets of the cold air passageway P1 and the warm air passageway P2. The second door is formed at the other side around the rotary shaft to adjust the degree of opening of a front seat outlet of the warm air passageway P2.

The air conditioner for a vehicle according to the preferred embodiment of the present invention is to control temperature of the driver's seat, the front passenger's seat, and three independent zones of the rear seat, and the three doors control temperature of the rear seat. That is, the air conditioner for a vehicle includes a first rear seat temp door 272, a second rear seat temp door 259, and the rear seat mode door 258.

The first rear seat temp door 272 is arranged between the evaporator 220 and the heater core 230 to adjust the degree of opening of the other part of the warm air passageway P2. That is, the first rear seat temp door 272 adjusts the degree of opening of a lower part of an inlet of the warm air passageway P2 which is not covered by the front seat temp door 271.

The second rear seat temp door 259 is arranged downstream of the heater core 230, and adjusts the degree of opening of the warm air passageway P2 and the rear seat cold air passageway P3. The second rear seat temp door 259 is a dome door type. The warm air passageway P2 and the rear seat cold air passageway P3 downstream of the heater core 230 are communicated with each other. The second rear seat temp door 259 is arranged in a communication path between the warm air passageway P2 and the rear seat cold air passageway P3 downstream of the heater core 230. That is, the second rear seat temp door 259 adjusts the degree of opening of the communication path between the warm air passageway P2 and the cold air passageway P3 and the rear seat cold air passageway P3.

The rear seat mode door 258 is arranged downstream of the second rear seat temp door 150 to adjust the degree of opening of the rear seat air outlet. The rear seat mode door 258 is a dome-shaped door. The rear seat mode door 258 adjusts the degree of opening between the rear seat air passageway, the console vent 215, and the rear seat floor vent 216.

That is, the rear seat mode door 258 is rotated to the maximum in the counterclockwise direction in FIG. 4 to close the rear seat air passageway or rotated at a predetermined angle in the clockwise direction to close the rear seat floor vent 216 and open the console vent 215. Alternatively, the rear seat mode door 258 is rotated to the maximum in the clockwise direction to close the console vent 215 and open the rear seat floor vent 216 or is located in the middle between the console vent 215 and the rear seat floor vent 216 to open the two vents.

The air conditioner for a vehicle controls temperature of the rear seat using the first rear seat temp door 272 and the second rear seat temp door 259. Furthermore, the air conditioner for a vehicle controls opening (on) and closing (off) of the rear seat air passageway using the rear seat mode door 258. As described above, compared with the conventional air conditioner, the air conditioner for a vehicle according to the present invention can realize a three-zone air conditioner which can reduce the number of doors and perform control of the rear seat air-conditioning smoothly. Therefore, the air conditioner for a vehicle according to the present invention can reduce the number of the components, manufacturing costs, and weight and volume of the air conditioner.

Under a condition that the rear seat mode door 258 closes the rear seat air passageway, the location of the first rear seat temp door 272 is changed according to front seat conditions. In detail, when the rear seat mode door 258 closes the rear seat air passageway, in case that the front seat temp door 271 is in the maximum cooling mode of the front seat, the first rear seat temp door 272 is in the maximum cooling mode of the rear seat.

Additionally, when the rear seat mode door 258 closes the rear seat air passageway, the first rear seat temp door 272 is located in the maximum heating mode of the rear seat in case that the front seat temp door 271 is not in the maximum cooling mode of the front seat, the first rear seat temp door 272 is in the maximum heating mode of the rear seat. In this instance, the front seat temp door 271 is in the maximum heating mode or a mixing mode of the front seat in case that the front seat temp door 271 is not in the maximum cooling mode of the front seat.

As described above, because the location of the first rear seat temp door 272 is changed according to the front seat conditions, the air conditioner can maximize performance of the heater core 230 at the front seat by guiding all of the air to flow to the warm air passageway P2 so as to enhance heating performance.

The first rear seat temp door 272 is a dome-shaped door. The first rear seat temp door 272 is located to close the warm air passageway P2 under the condition of the maximum cooling mode, and is located to partition the evaporator 220 and the heater core 230 under the condition of the maximum heating mode.

That is, the first rear seat temp door 272 guides the air existing in the dome toward the warm air passageway P2 in the case that the front seat temp door 271 is not in the maximum cooling mode of the front seat. Through the above structure, the inner face of the streamlined dome can guide the air passed through the evaporator 220 toward the heater core 230 of the warm air passageway P2 more smoothly.

The first rear seat temp door 272 is formed to always open the rear seat cold air passageway P3. That is, the first rear seat temp door 272 does not perform the on-off action of the rear seat cold air passageway P3 but performs the opening and closing function of the warm air passageway P2 and an air guiding function in order to enhance performance of the heater core. Furthermore, the on-off action of the rear seat cold air passageway P3 is performed by the rear seat mode door 258, so that the air conditioner can reduce the number of doors and smoothly perform the on-off action for the rear seat air-conditioning.

In the meantime, the first rear seat temp door 272 and the second rear seat temp door 258 are controlled to adjust temperature of the rear seat. That is, in the maximum cooling mode, the first rear seat temp door 272 closes the warm air passageway P2, and the second rear seat temp door 259 closes the communication path between the warm air passageway P2 and the rear seat cold air passageway P3 downstream of the heater core 230. Moreover, in the maximum heating mode, the dome-shaped inner face of the first rear seat temp door 272 is located to guide air toward the warm air passageway P2, and the second rear seat temp door 259 is located to close the rear seat cold air passageway P3.

Furthermore, in the mixing mode, the dome-shaped inner face of the first rear seat temp door 272 is located to guide the air toward the warm air passageway P2, and the second rear seat temp door 259 is located between the communication path between the warm air passageway P2 and the rear seat cold air passageway P3 downstream of the heater core 230 and the rear seat cold air passageway P3.

Figure 13:
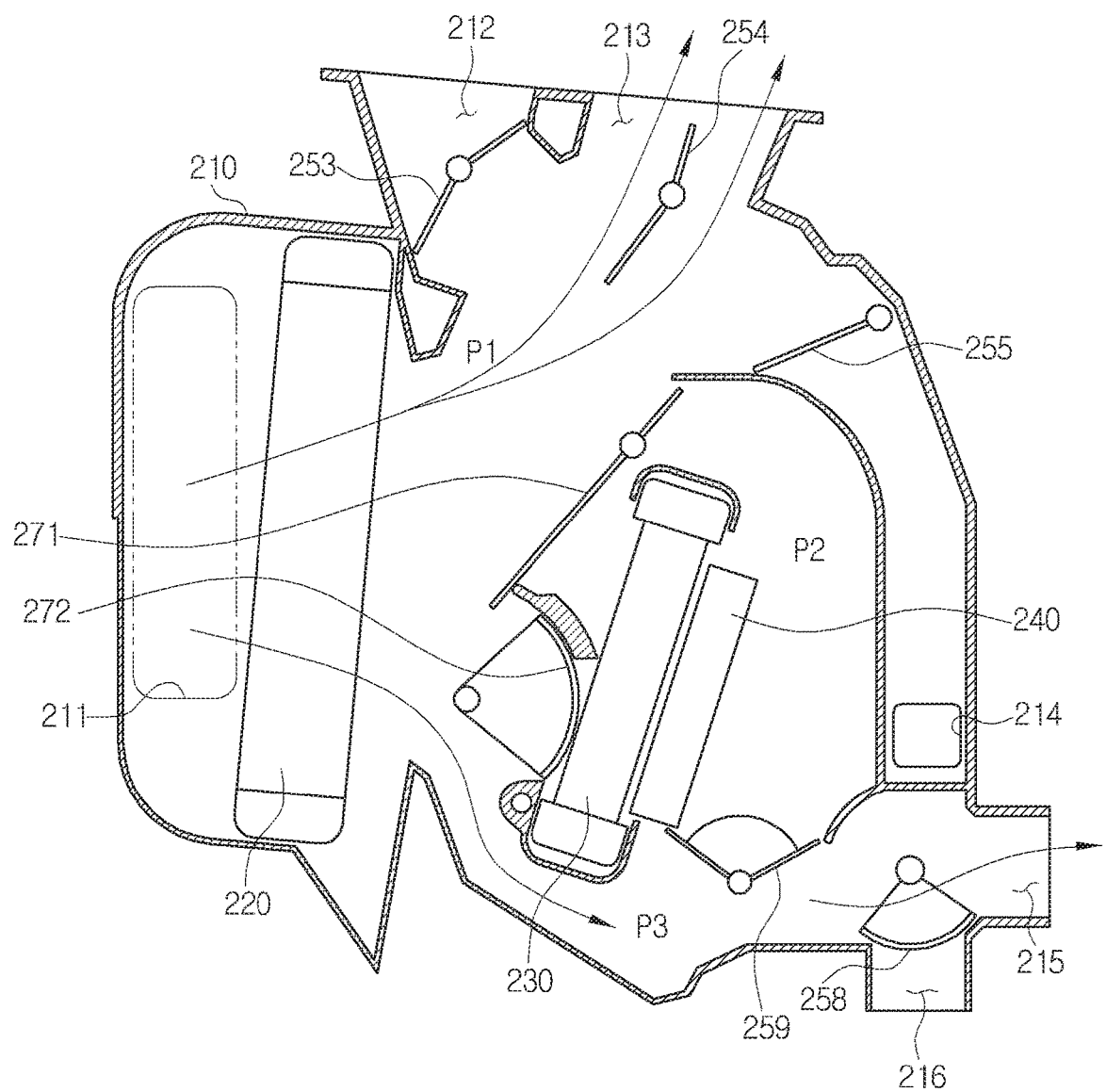
FIG. 13 is a view showing a rear seat vent mode of the air conditioner for a vehicle according to the second preferred embodiment of the present invention.

FIG. 13 is a view showing a rear seat vent mode of the air conditioner for a vehicle according to the second preferred embodiment of the present invention. Referring to FIG. 13, some of the air passed through the evaporator 220 is discharged to the front seat face vent 213 through the front seat cold air passageway P1, and the rest of the air is discharged to the console vent 215 through the rear seat cold air passageway P3. In this instance, the front seat temp door 271 and the first rear seat temp door 272 close the warm air passageway P2, and the second rear seat temp door 259 closes the communication path between the warm air passageway and the rear seat cold air passageway. Additionally, the rear seat mode door 258 closes the rear seat floor vent 216 and communicates the rear seat air passageway and the console vent with each other.

Figure 14:
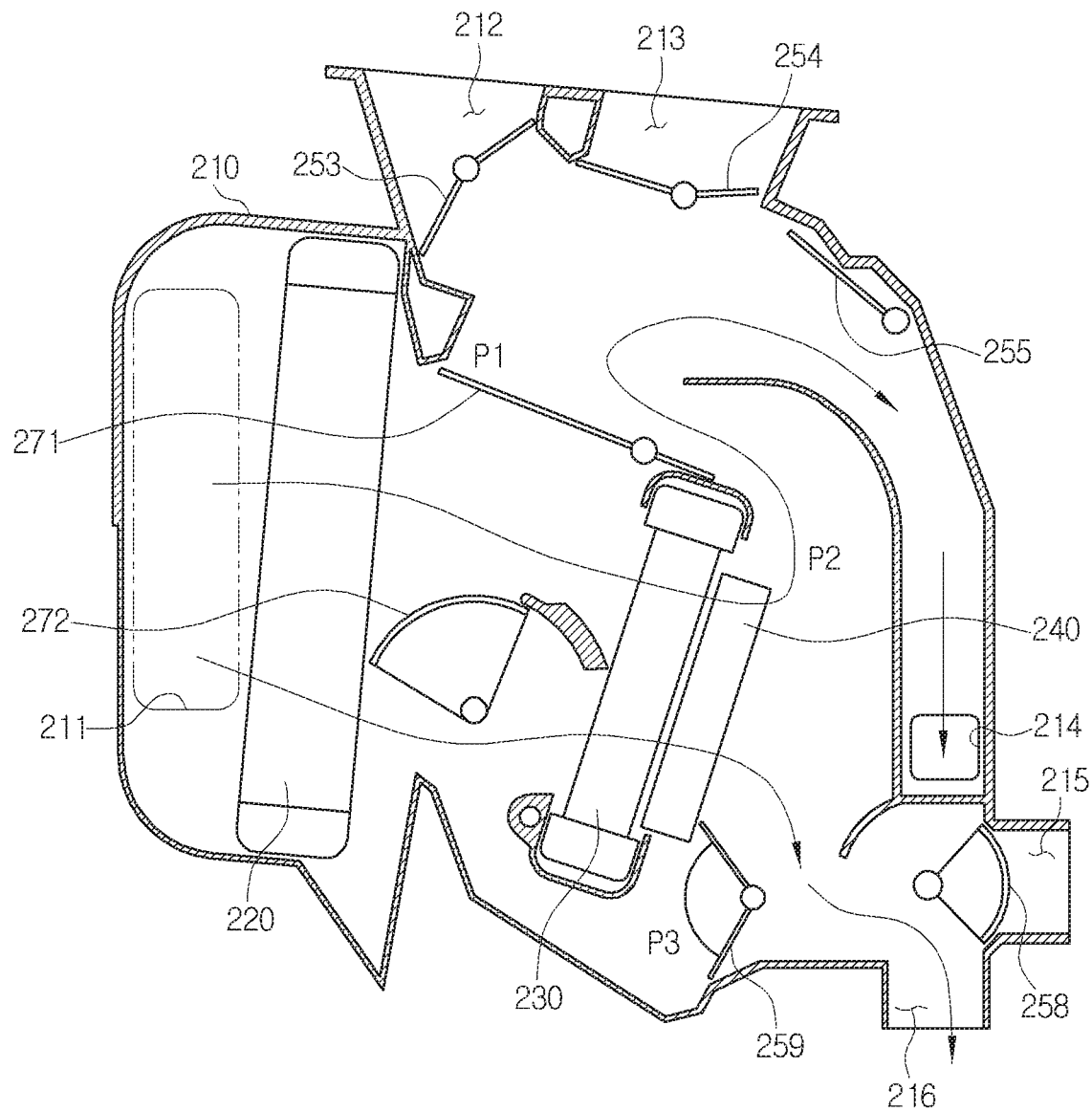
FIG. 14 is a view showing a rear seat floor mode of the air conditioner for a vehicle according to the second preferred embodiment of the present invention.

FIG. 14 is a view showing a rear seat floor mode of the air conditioner for a vehicle according to the second preferred embodiment of the present invention. Referring to FIG. 14, the air passed through the evaporator 220 flows to the warm air passageway P2 and passes through the heater core 230 and an electric heater 240, and then, some of the air is discharged to the front seat floor vent 214 and the rest of the air is discharged to the rear seat floor vent 216 through the communication path between the warm air passageway and the rear seat cold air passageway. In this instance, the front seat temp door 271 and the first rear seat temp door 272 open the warm air passageway P2, and the second rear seat temp door 259 closes the rear seat cold air passageway P3 and opens the communication path between the warm air passageway and the rear seat cold air passageway. In addition, the rear seat mode door 258 closes the console vent 215 and communicates the rear seat air passageway and the rear seat floor vent 216 with each other.

Figure 15:
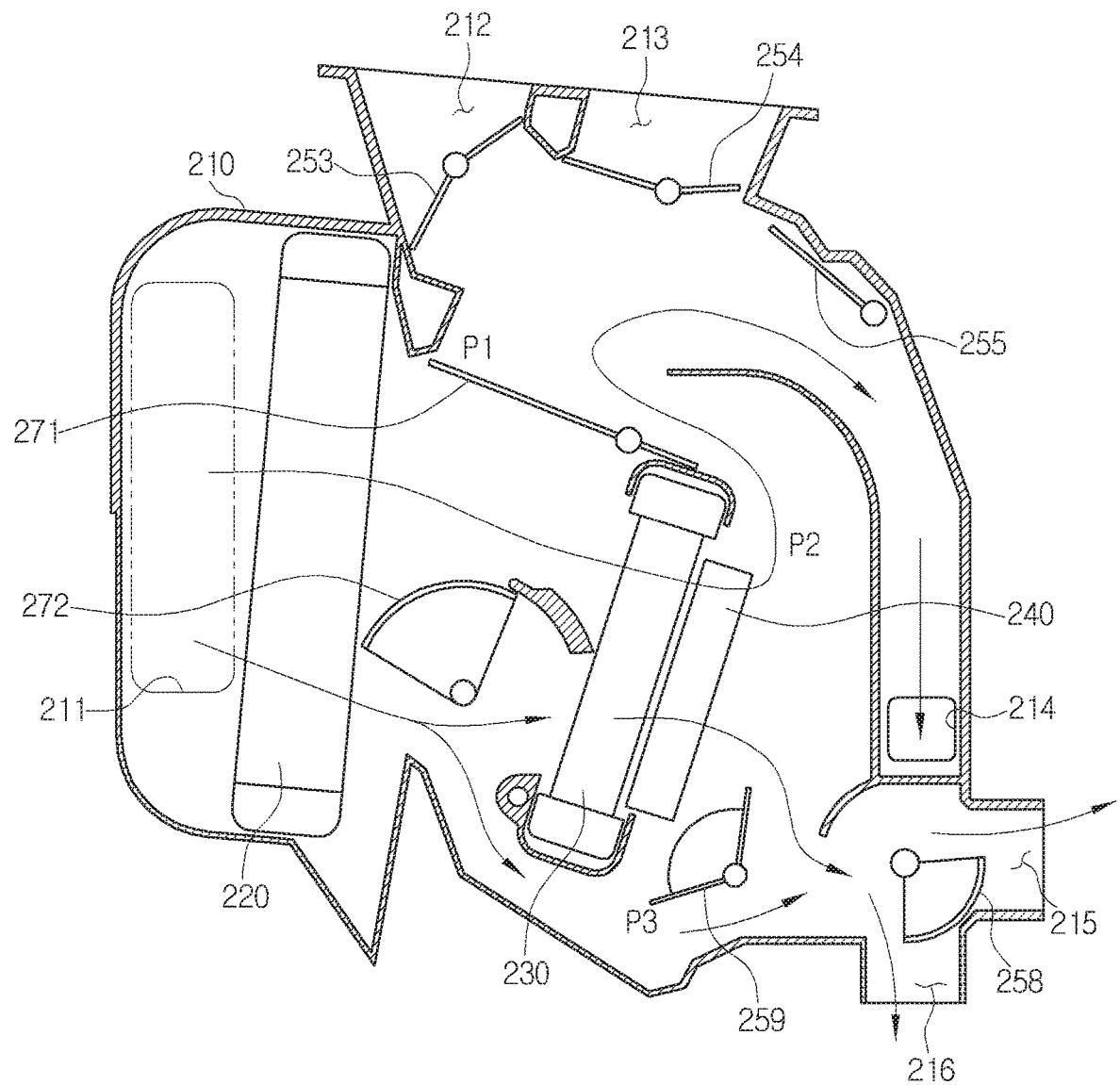
FIG. 15 is a view showing rear seat off mode of the air conditioner for a vehicle according to the second preferred embodiment of the present invention.

FIG. 15 is a view showing rear seat off mode of the air conditioner for a vehicle according to the second preferred embodiment of the present invention. Referring to FIG. 15, as shown in FIG. 14, the front seat may be in the front seat floor mode or the bi-level mode that the front seat face vent 213 is opened partially. Some of the air passed through the evaporator 220 flows toward the warm air passageway P2, passes through the heater core 230 and the electric heater 240, and then, flows to the rear seat air passageway after passing through the communication path between the warm air passageway and the rear seat cold air passageway. The rest of the air passed through the evaporator 220 passes through the warm air passageway P2 through the rear seat cold air passageway P3, and is mixed with the heated air. The mixed air is discharged to the console vent 215 and the rear seat floor vent 216.

In this instance, the first rear seat temp door 272 opens the warm air passageway P2, and the second rear seat temp door 259 is locate at the center to open the communication path among the rear seat cold air passageway P3, the warm air passageway and the rear seat cold air passageway in order to adjust temperature. Moreover, the rear seat mode door 258 is located in the middle of the console vent 215 and the rear seat floor vent 216 to realize the bi-level mode.

Figure 16:
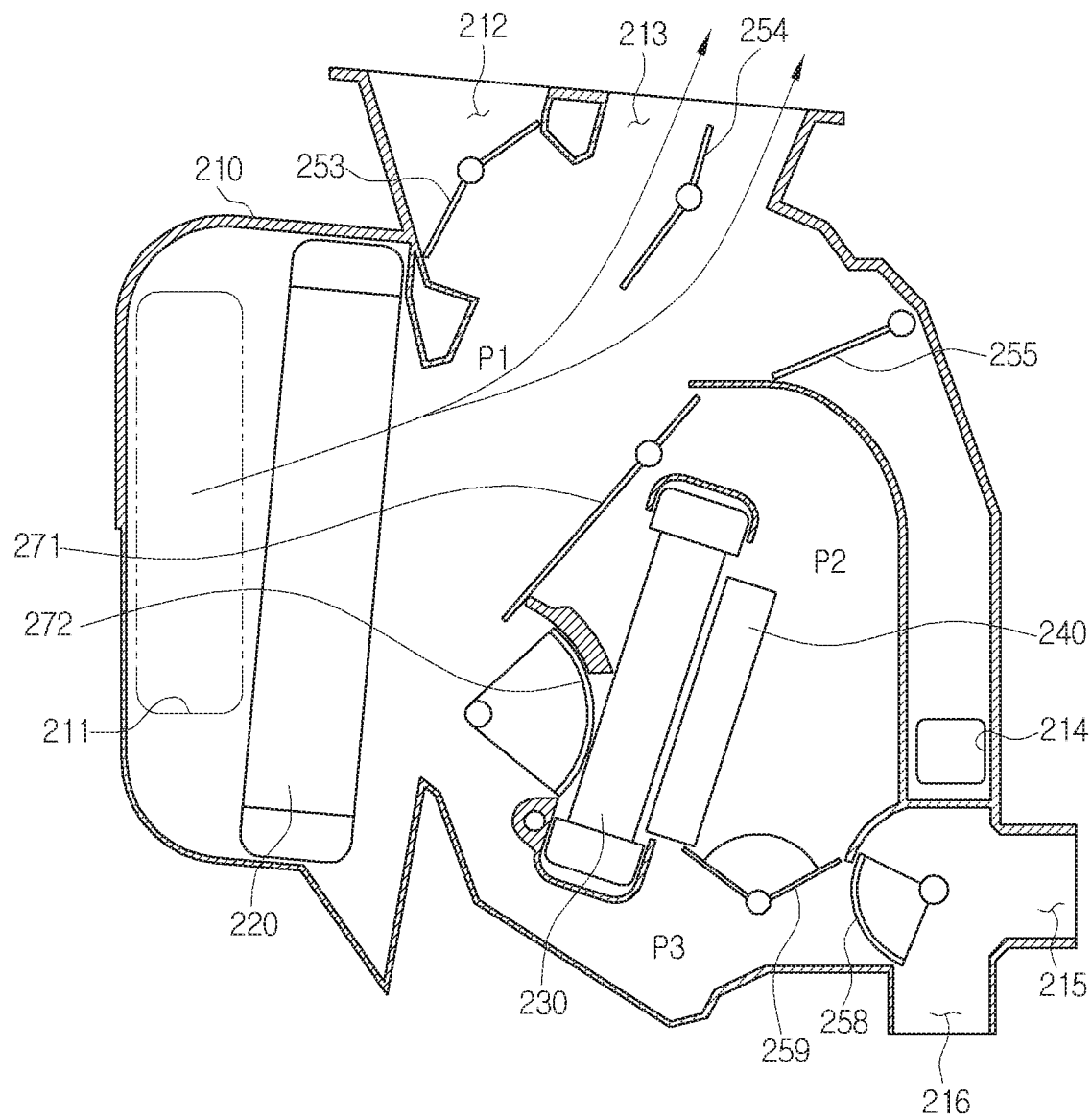
FIG. 16 is a view showing a rear seat bi-level mode of the air conditioner for a vehicle according to the second preferred embodiment of the present invention.

FIG. 16 is a view showing a rear seat bi-level mode of the air conditioner for a vehicle according to the second preferred embodiment of the present invention. Referring to FIG. 16, the air passed through the evaporator 220 is discharged to the front seat face vent 213 through the front seat cold air passageway P1. In this instance, the front seat temp door 271 and the first rear seat temp door 272 close the warm air passageway P2, and the second rear seat temp door 259 closes the communication path between the warm air passageway and the rear seat cold air passageway. Furthermore, the rear seat mode door 258 closes the rear seat air passageway so that the air passed through the evaporator 220 flows to the front seat cold air passageway P1.

Figure 17:
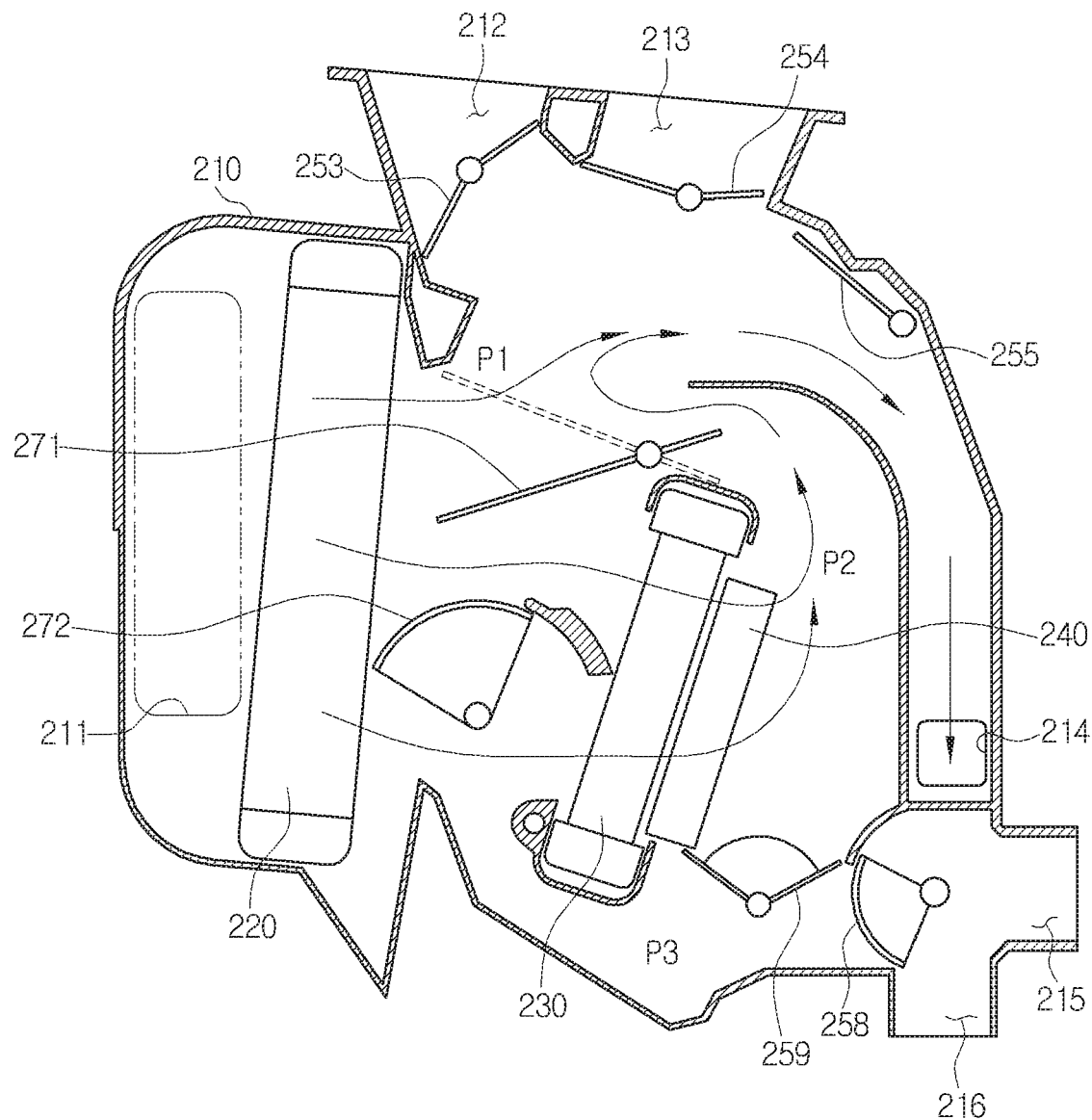
FIG. 17 is a view showing a case that the air conditioner for a vehicle according to the second preferred embodiment of the present invention is not in a maximum cooling mode of the front seat.

FIG. 17 is a view showing a case that the air conditioner for a vehicle according to the second preferred embodiment of the present invention is not in a maximum cooling mode of the front seat. Referring to FIG. 17, the air passed through the evaporator 220 flows to the warm air passageway P2, passes through the heater core 230 and the electric heater 240, and then, is discharged to the front seat floor vent 214. If the air conditioner is not in the maximum cooling mode of the front seat, it may be in the maximum heating mode or the mixing mode of the front seat. In this instance, the first rear seat temp door 272 opens the warm air passageway P2. The front seat temp door 271 is formed to fully open the warm air passageway P2 as shown by the dotted line of FIG. 17 or to partially open the warm air passageway P2 as shown by the solid line to mix cold air and warm air. The second rear seat temp door 259 closes the communication path between the warm air passageway and the rear seat cold air passageway. Furthermore, the rear seat mode door 258 closes the rear seat air passageway.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

The invention claimed is:

1. An air conditioner for a vehicle, the air conditioner comprising:
    an air-conditioning case having an air passageway formed therein and a heat exchanger for cooling and a heat exchanger for heating disposed in the air passageway and configured to exchange heat with air passing through the air passageway, the air conditioner comprising:
    the air passageway having a front seat cold air passageway portion bypassing the heat exchanger for heating, a warm air passageway portion along the heat exchanger for heating, and a rear seat cold air passageway portion bypassing the heat exchanger for heating and separate from the front seat cold air passageway portion;
    a front seat temp door configured to adjust a degree of opening between the front seat cold air passageway portion and the warm air passageway portion;
    a first rear seat temp door arranged between the heat exchanger for cooling and the heat exchanger for heating to and configured to adjust a degree of opening of the warm air passageway portion;
    a second rear seat temp door arranged downstream of the heat exchanger for heating and configured to adjust a degree of opening between the warm air passageway portion and the rear seat cold air passageway portion; and
    a rear seat mode door arranged downstream of the second rear seat temp door to adjust a degree of opening of a rear seat air outlet and configured to open and close the rear seat cold air passageway portion;
    wherein the first rear seat temp door is aligned with the heat exchanger for heating in a direction of airflow toward the heat exchanger for heating and is moveable to different positions of coverage over the heat exchanger for heating, such that the first rear seat temp door is configured to close the warm air passageway portion along with the front seat temp door in a maximum cooling mode, and to partition air flowing from the heat exchanger for cooling toward the heat exchanger for heating in a maximum heating mode for smoothly guiding air that has passed through the heat exchanger for cooling toward the heat exchanger for heating in the warm air passageway portion.

2. The air conditioner according to claim 1, wherein when the rear seat mode door closes the rear seat air passageway portion, the location of the first rear seat temp door is changed according to front seat conditions.

3. The air conditioner according to claim 2, wherein when the rear seat mode door closes the rear seat air passageway portion, in a case that the front seat temp door is in a maximum cooling mode of the front seat, the first rear seat temp door is in a maximum cooling mode of the rear seat.

4. The air conditioner according to claim 2, wherein when the rear seat mode door closes the rear seat air passageway portion, in a case that the front seat temp door is not in a maximum cooling mode of the front seat, the first rear seat temp door is in the maximum heating mode of the rear seat.

5. The air conditioner according to claim 1, wherein the first rear seat temp door is formed in a dome shape.

6. The air conditioner according to claim 5, wherein the first rear seat temp door has a dome-shaped inside to guide air toward the warm air passageway when the front seat temp door is not in a maximum cooling mode of the front seat.

7. The air conditioner according to claim 1, wherein the first rear seat temp door is configured such that it cannot close the rear seat cold air passageway.

8. The air conditioner according to claim 1, wherein the rear seat air outlet includes a console vent and a rear seat floor vent, and
    wherein the rear seat mode door is a dome type door formed in a dome shape, and adjusts the degree of opening between the console vent and the rear seat floor vent through the rear seat air passageway portion.

9. The air conditioner according to claim 1, wherein the warm air passageway portion and the rear seat cold air passageway portion downstream of the heat exchanger for heating are communicated with each other, and
    wherein the second rear seat temp door adjusts the degree of opening between the communication path between the warm air passageway portion and the rear seat cold air passageway portion downstream of the heat exchanger for heating and the rear seat cold air passageway.

10. The air conditioner according to claim 9, wherein in a maximum cooling mode, the second rear seat temp door is located to close a communication path between the warm air passageway portion and the cold air passageway portion downstream of the heat exchanger for heating.

11. The air conditioner according to claim 9, wherein in a maximum heating mode, the second rear seat temp door is located to close the rear seat cold air passageway portion.

12. The air conditioner according to claim 9, wherein in a mixing mode, the second rear seat temp door is located between the communication path between the warm air passageway portion and the rear seat cold air passageway portion downstream of the heat exchanger for heating and the rear seat cold air passageway portion.

13. The air conditioner according to claim 1, wherein the first rear seat temp door is aligned with the heat exchanger for heating in a direction that extends perpendicularly to a face of the heat exchanger for heating upstream of the heat exchanger for heating.

14. An air conditioner for a vehicle, the air conditioner comprising:
    an air-conditioning case having an air passageway formed therein and a heat exchanger for cooling and a heat exchanger for heating disposed in the air passageway and configured to exchange heat with air passing through the air passageway;
    the air passageway having a front seat cold air passageway portion bypassing the heat exchanger for heating, a warm air passageway portion along the heat exchanger for heating, and a rear seat cold air passageway bypassing the heat exchanger for heating and separate from the front seat cold air passageway;
    a front seat temp door configured to adjust a degree of opening between the front seat cold air passageway and the warm air passageway;
    a first rear seat temp door arranged between the heat exchanger for cooling and the heat exchanger for heating to further adjust a degree of opening of the warm air passageway;
    a second rear seat temp door arranged downstream of the heat exchanger for heating and configured to adjust a degree of opening between the warm air passageway and the rear seat cold air passageway; and
    a rear seat mode door arranged downstream of the second rear seat temp door to adjust a degree of opening of a rear seat air outlet and configured to open and close the rear seat cold air passageway;
    wherein the first rear seat temp door is configured such that it cannot close the rear seat cold air passageway.

* * * * *